(12) United States Patent
Seder et al.

(10) Patent No.: US 10,423,038 B2
(45) Date of Patent: Sep. 24, 2019

(54) CONFORMAL LIGHT-EMITTING DISPLAY ASSEMBLY

(71) Applicant: GM GLOBAL TECHNOLOGY OPERATIONS LLC, Detroit, MI (US)

(72) Inventors: Thomas A. Seder, Warren, MI (US); James A. Carpenter, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/451,913

(22) Filed: Mar. 7, 2017

(65) Prior Publication Data

US 2017/0293183 A1 Oct. 12, 2017

Related U.S. Application Data

(60) Provisional application No. 62/320,070, filed on Apr. 8, 2016.

(51) Int. Cl.
| | | |
|---|---|---|
| *G02F 1/135* | (2006.01) | |
| *G02F 1/1335* | (2006.01) | |
| *G02F 1/1333* | (2006.01) | |
| *G02F 1/1368* | (2006.01) | |

(Continued)

(52) U.S. Cl.
CPC ............ *G02F 1/135* (2013.01); *G02F 1/1368* (2013.01); *G02F 1/133305* (2013.01); *G02F 1/133514* (2013.01); *G02F 1/133528* (2013.01); *G02B 6/0051* (2013.01); *G02F 1/13338* (2013.01); *G02F 1/133308* (2013.01); *G02F 1/133526* (2013.01); *G02F 1/136209* (2013.01); *G02F 2001/133302* (2013.01); *G02F 2001/133614* (2013.01); *G02F 2201/503* (2013.01); *G02F 2201/56* (2013.01); *G02F 2202/36* (2013.01)

(58) Field of Classification Search
CPC .............. G02F 1/135; G02F 1/133305; G02F 1/13336; G02F 1/133514
See application file for complete search history.

(56) References Cited

U.S. PATENT DOCUMENTS 6,831,727 B2 * 12/2004 Akiyama .......... G02F 1/133305 257/59
7,468,770 B2 * 12/2008 Okumura .............. G02F 1/1323 349/123

(Continued)

FOREIGN PATENT DOCUMENTS

CN 107272258 A 10/2017
DE 102017205943 A1 10/2017

*Primary Examiner* — Dung T Nguyen
(74) *Attorney, Agent, or Firm* — Harness, Dickey & Pierce, P.L.C.

(57) ABSTRACT

A display assembly includes a display unit for displaying an image. The display unit includes a backlight unit configured to provide light. A color conversion layer is positioned adjacent to and configured to receive the light from the backlight unit. A structural layer is positioned adjacent to the color conversion layer and configured to support the display unit. A first stack is positioned adjacent to the structural layer and includes a first thin-film-transistor (TFT) layer, a color filter layer and a first liquid crystal layer. The display unit is configured to be bendable to a fixed shape such that the display unit retains the fixed shape.

7 Claims, 2 Drawing Sheets

(51) Int. Cl.
*F21V 8/00* (2006.01)
*G02F 1/1362* (2006.01)

(56) References Cited

U.S. PATENT DOCUMENTS

| | | | |
|---|---|---|---|
| 8,339,528 B2* | 12/2012 | Mori | G02F 1/13718 349/12 |
| 2005/0190329 A1* | 9/2005 | Okumura | G02F 1/1323 349/123 |
| 2014/0267099 A1* | 9/2014 | Blair | G06F 1/1692 345/173 |
| 2015/0177443 A1* | 6/2015 | Faecke | G02B 6/0035 349/65 |
| 2016/0147101 A1* | 5/2016 | Saneto | G02F 1/13362 349/71 |
| 2017/0108726 A1* | 4/2017 | Yanai | G02B 5/30 |
| 2017/0202094 A1* | 7/2017 | Kim | H04B 1/3888 |
| 2018/0284613 A1* | 10/2018 | Hirayama | G03F 7/16 |

* cited by examiner

CONFORMAL LIGHT-EMITTING DISPLAY ASSEMBLY

CROSS-REFERENCE TO RELATED APPLICATIONS

This application claims the benefit of U.S. Provisional Patent Application No. 62/320,070, filed on Apr. 8, 2016, the disclosure of which is hereby incorporated by reference.

INTRODUCTION

The disclosure relates generally to a conformal light-emitting display assembly. Many devices include various forms of display units having a liquid crystal layer. The display units are generally rectangular and have a flat surface to accommodate the electronic circuitry and other components.

SUMMARY

A display assembly includes a display unit for displaying an image. The display unit includes a backlight unit configured to provide light. A color conversion layer is positioned adjacent to and configured to receive the light from the backlight unit. A structural layer is positioned adjacent to the color conversion layer and configured to support the display unit. A first stack is positioned adjacent to the structural layer and includes a first thin-film-transistor (TFT) layer, a color filter layer and a first liquid crystal layer. The display unit is configured to be bendable to a fixed shape such that the display unit retains the fixed shape.

The first TFT layer is composed of a plurality of thin film transistors deposited on a first substrate. The thin film transistors may be formed from high electron mobility materials, such as polycrystalline silicon, amorphous silicon, Indium Gallium Zinc Oxide, and other metal oxides. The first substrate may be a glass layer having a thickness of about 0.1 mm. The first substrate may be composed of a polymer layer affixed to a relatively thin contaminant blocking layer, the blocking layer being composed of an inorganic oxide material. The color filter layer may include a plurality of color filter patterns formed on a second substrate. The second substrate may be composed of glass with a thickness of about 0.1 mm.

The display unit may further include a spatial light modulator between the first stack and the structural layer. The spatial light modulator is configured to selectively modulate luminance of the light from the backlight unit. The spatial light modulator includes a second stack sandwiched between a second polarizer and a third polarizer. The second stack includes a second TFT layer and a liquid crystal layer. The second TFT layer is composed of another plurality of thin film transistors deposited on a second substrate. The structural layer may include a shock-absorbing material.

The color conversion layer may include a plurality of quantum rods arranged in a first direction and configured to emit visible light polarized in the first direction. The display unit may be non-rectangular. The display unit may include a cover lens having an anti-reflective coating disposed on a front end of the display unit and a first polarizer adjacent to the cover lens. A first stack may be adjacent to the first polarizer and includes a first TFT layer, a color filter layer and a first liquid crystal layer. A second polarizer may be adjacent to the first stack. In another embodiment, the structural layer may be positioned directly adjacent to the second polarizer and configured to support the display unit.

This optimal combination of the various layers allows the display unit to provide a high performance, conformal and perimeter-shaped display at a relatively low cost. Additionally, the image produced by this optimal combination does not suffer from lingering effects, such as for example, organic LEDs.

DETAILED DESCRIPTION

Figure 1:
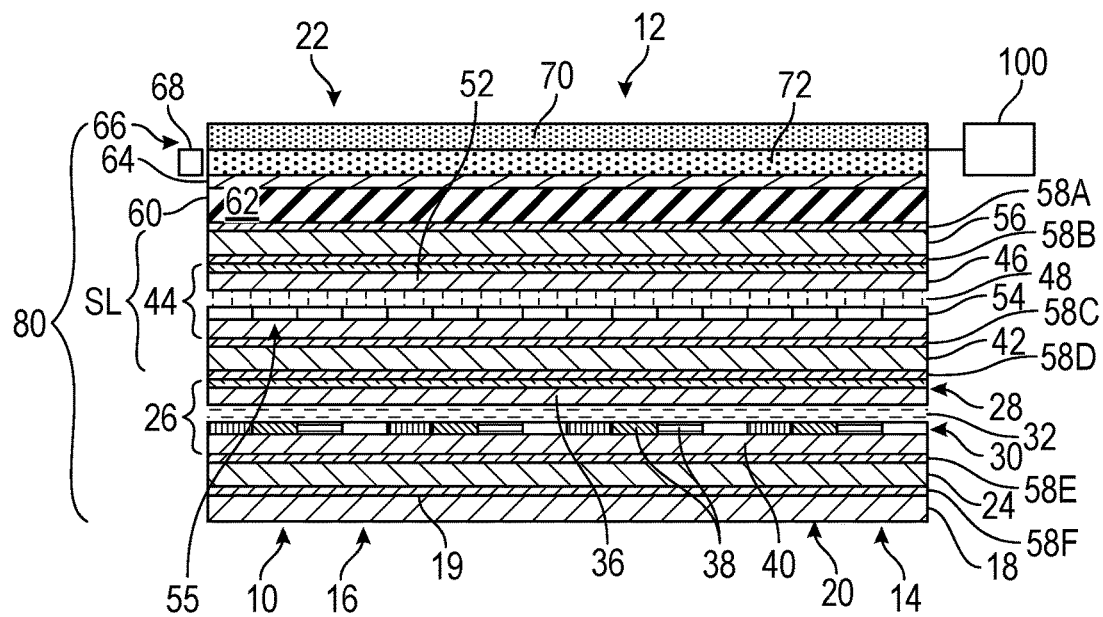
FIG. 1 is a schematic fragmentary sectional view of a display assembly having a display unit, in accordance with a first embodiment.
Figure 2:
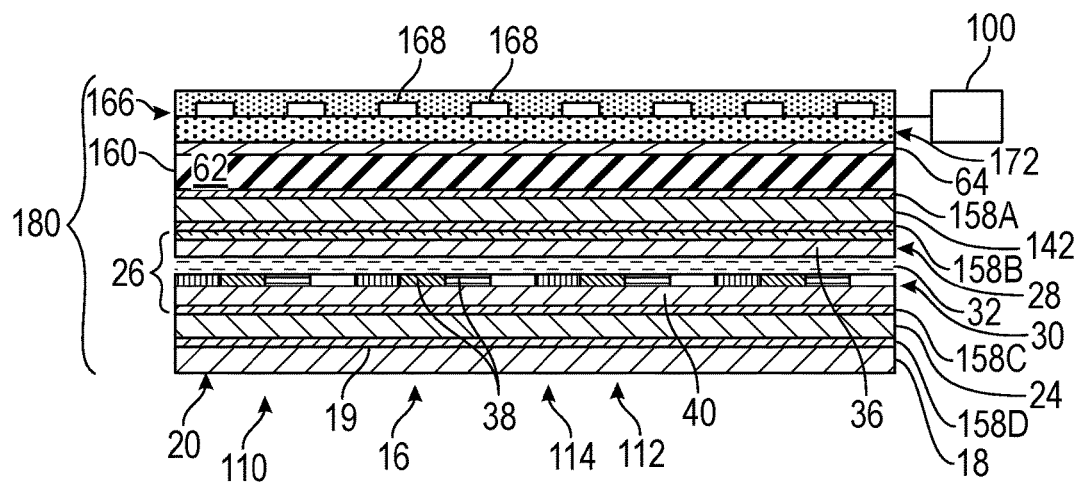
FIG. 2 is a schematic fragmentary sectional view of a display assembly having a display unit, in accordance with a second embodiment.

Referring to the drawings, wherein like reference numbers refer to like components, FIGS. 1-2 schematically illustrate display assemblies 10, 110, in accordance with first and second embodiments of the disclosure, respectively. Referring to FIGS. 1-2, the assemblies 10, 110 may be part of respective devices 12, 112. The devices 12, 112 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other device. The devices 12, 112 may be a non-mobile platform, including, but not limited to, a desktop computer, and may take many different forms and include multiple and/or alternate components.

Referring to FIG. 1, the assembly 10 includes a display unit 14 for displaying an image at a front end 16. The display unit 14 has a cover lens 18 disposed at the front end 16. The cover lens 18 includes an anti-reflective coating 20. The back end 22 of the display unit 14 is also shown in FIG. 1. A first polarizer 24 is positioned adjacent to the cover lens 18. The assembly 10 may include a touch sensor layer 19 formed by depositing conductive materials on the back side of the cover lens 18; a distrete layer of conductive materials may be added as well. As described below, the display unit 14 includes a plurality of layers. It is to be appreciated that the sequence of the layers may be other than the order recited below.

Referring to FIG. 1, a first stack 26 may be positioned adjacent to the first polarizer 24 and includes a first thin-film-transistor (TFT) layer 28, a color filter layer 30 and a first liquid crystal layer 32. The first TFT layer 28 may be composed of plurality of thin film transistors deposited on a first substrate 36. The thin film transistors may be formed from high electron mobility materials, such as polycrystalline silicon, amorphous silicon, Indium Gallium Zinc Oxide, and other metal oxides. The color filter layer 30 includes a plurality of color filter patterns 38 formed on a second substrate 40. In one example, the color filter patterns 38 are red, green, and blue (RGB). In another example, the color filter patterns 38 are red, green, blue and white (RGBW).

Referring to FIG. 1, spatial light modulator (SL) may be positioned directly adjacent to the first stack 26. The spatial light modulator (SL) includes a second stack 44, a second polarizer 42 and a third polarizer 56, with the second stack 44 being sandwiched between the second and third polarizers 42, 56. The spatial light modulator (SL) is configured to selectively modulate luminance of the light (on a pixel-by-pixel basis) entering it. As is understood by those skilled in the art, luminance is the luminous intensity projected on a given area and direction. Luminance is an objectively measurable attribute, with a unit of candela per square meter. The lamination of the spatial light modulator to the display unit enables local backlight dimming, i.e., achieves low black state luminance. The spatial light modulator (SL) may have a very high resolution and is a white light modulator. The spatial light modulator (SL) does not include color filters.

Referring to FIG. 1, the second stack 44 includes a second TFT layer 46 and a liquid crystal layer 48. The second TFT layer 46 may be composed of another plurality of thin film transistors deposited on a third substrate 52. The thin film transistors may be formed from high electron mobility materials, such as polycrystalline silicon, amorphous silicon, Indium Gallium Zinc Oxide, and other metal oxides. The second stack 44 may include a white filter layer 54 and fourth substrate 55. Other types of polarizers available to those skilled in the art may be employed for the first, second and third polarizers 24, 42, 56.

Referring to FIG. 1, in one embodiment, the first and second TFT layers 28, 46 may be composed of low-temperature polycrystalline silicon synthesized at relatively low temperatures, such as approximately 600° C. and below, compared to conventional methods which are above 900° C. This allows electronic circuitry deposited on the first and second TFT layers 28, 46 to have greater electron mobility, enabling smaller feature sizes, thus higher light transmission. Relatively thinner borders are also enabled on the of display unit 14.

Referring to FIG. 1, a structural layer 60 may be positioned adjacent to the third polarizer 56 and configured to support the display unit 14. The structural layer 60 may include a shock-absorbing material 62. In one example, the shock-absorbing material 62 is a polyurethane material with viscoelastic properties. In another example, the shock-absorbing material 62 is composed of rubber with a relatively high viscoelasticity. Other types of material that absorb impact energy may be employed. A color conversion layer 64 may be positioned adjacent to the structural layer 60. Films containing quantum rods, quantum dots, inorganic phosphors or other color conversion materials may be used.

Referring to FIG. 1, a backlight unit 66 is positioned adjacent to the color conversion layer 64. The backlight unit 66 may include at least one light-emitting diode (LED) source 68 positioned at an edge, a diffuser 70 and an optical guide 72. The light-emitting diode (LED) source 68 is configured to emit light which reflects off the diffuser and passes through the optical guide 72. The light subsequently travels through the various layers of the display unit 14, towards the front end 16.

The light-emitting diode (LED) source 68 may be configured to produce 454 nm radiation of all polarization states. The exact LED emission wavelength chosen is on the basis of coupling efficiency to the color conversion layer 64. This light may be directed toward the color conversion layer 64. In one example, the color conversion layer 64 includes a plurality of quantum rods aligned in a first direction. Because these rods are aligned, they will absorb the polarization state that is parallel to the polarization axis and will not absorb the perpendicular polarization. The excited quantum rods will emit radiation with a polarization state that is parallel to the axis of the rod. Thus the red and green light is polarized in the alignment direction and the blue light is largely unpolarized.

The first, second, third and fourth substrates 36, 40, 52, 55 may each be composed of a glass layer having a thickness of about 0.1 mm. For the first, second third and fourth substrates 36, 40, 52, 55, Willow Glass, available from Corning Inc. and having a thickness of about 0.1 mm, may be used. Alternatively, the first, second third and fourth substrates 36, 40, 52, 55 may be composed of a polymer layer that has been coated with a thin blocking layer of SiO2 or other suitable inorganic oxide material. The polymer layer may include but is not limited to, polyethylene terephthalate (PET), polyvinyl acetate (PVA) and polyimide (PI).

The display unit 14 may include a plurality of optically-clear adhesive layers. Referring to FIG. 1, a first optically-clear adhesive layer 58A is positioned between the structural layer 60 and the third polarizer 56. A second optically-clear adhesive layer 58B is positioned between the third polarizer 56 and the second stack 44. A third optically-clear adhesive layer 58C is positioned between the second stack 44 and second polarizer 42. A fourth optically-clear adhesive layer 58D is positioned between the second polarizer 42 and the first stack 26. A fifth optically-clear adhesive layer 58E is positioned between the first stack 26 and the first polarizer 24. A sixth optically-clear adhesive layer 58F is positioned between the first polarizer 24 and the cover lens 18.

Referring now to FIG. 2, the second embodiment is similar to the first embodiment, except for the following differences. In FIG. 2, the display unit 114 does not include the second stack 44 of FIG. 1. The backlight unit 166 in the display unit 114 includes a matrix 168 having a plurality of light-emitting diode (LED) sources, arranged in a grid-like manner, and an air gap 172. In the display unit 114, the structural layer 160 is positioned adjacent to the second polarizer 142.

The display unit 114 may include a plurality of optically-clear adhesive layers. Referring to FIG. 2, a first optically-clear adhesive layer 158A is positioned between the structural layer 160 and the second polarizer 142. A second optically-clear adhesive layer 158B is positioned between the second polarizer 142 and the first stack 26. A third optically-clear adhesive layer 158C is positioned between the first stack 26 and the first polarizer 24. A fourth optically-clear adhesive layer 158D is positioned between the first polarizer 24 and the cover lens 18.

Figure 3:
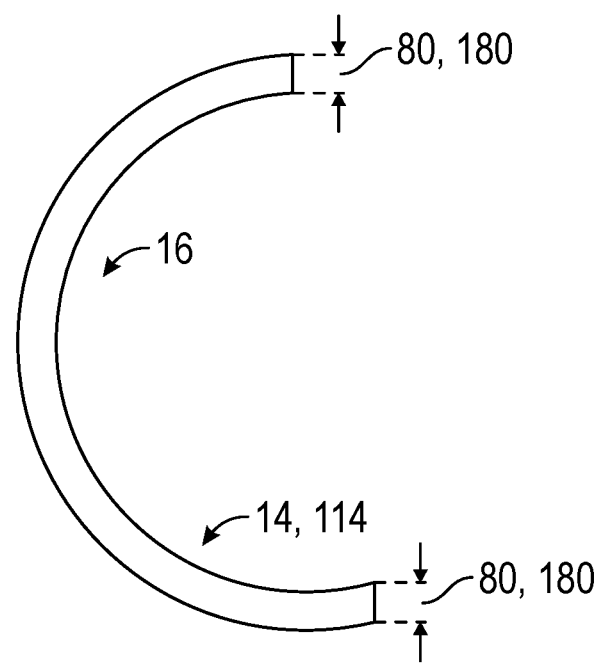
FIG. 3 is an example side profile of the display unit of FIGS. 1-2.
Figure 4:
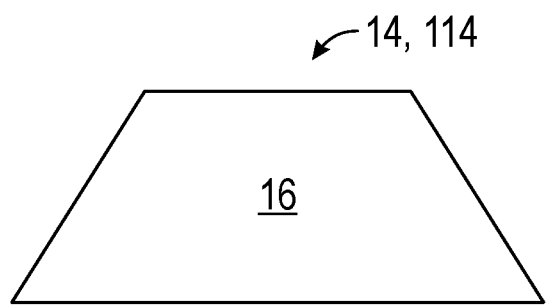
FIG. 4 is an example front view of the display unit of FIGS. 1-2.

The combination of the various layers allows the display units 14, 114 to provide a high performance, conformal and perimeter-shaped display at a relatively low cost. Additionally, the image produced does not suffer from lingering effects, such as for example, organic LEDs. Referring to FIG. 3, an example side profile of the display units 14, 114 is shown. Referring to FIGS. 1-3, the respective widths 80, 180 of the display units 14, 114 may be configured to be between about 0.5 mm and 5 mm. The display units 14, 114 are conformal, i.e., the display unit is configured to be bendable to a fixed shape such that the display unit retains the fixed shape. Referring to FIG. 4, an example front view of the display units 14, 114 is shown. The display units 14, 14 may be perimeter-shaped, i.e., may be trimmed to be the desired shape suitable for the application at hand. The display units 14, 14 may be non-rectangular, such as for example, trapezoidal shaped.

Referring to FIGS. 1-2, the assemblies 10 and 110 may each include a controller 100 for controlling the respective pluralities of pixels associated with the first TFT layer 28, the second TFT layer 46 and the spatial light modulator (SL). The controller 100 may include other power and driver circuits for controlling the backlight unit. Referring to FIGS. 1-2, the controller 100 may include a respective computer-readable medium (also referred to as a processor-readable medium), including non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A display assembly comprising:
    a display unit for displaying an image, the display unit including:
        a cover lens having an anti-reflective coating disposed on a front end of the display unit;
        a first polarizer adjacent to the cover lens;
        a first stack adjacent to the first polarizer and including a first TFT layer, a color filter layer and a first liquid crystal layer, the first TFT layer comprising a plurality of thin film transistors deposited on a first substrate;
        a spatial light modulator positioned adjacent to the first stack, the spatial light modulator including a second stack sandwiched between a second polarizer and a third polarizer;
        wherein the second stack includes a second TFT layer comprising another plurality of thin film transistors deposited on a second substrate;
        a structural layer positioned adjacent to the spatial light modulator and configured to support the display unit;
        a color conversion layer positioned adjacent to the structural layer and including a plurality of aligned quantum rods;
        a backlight unit adjacent to the color conversion layer, the backlight unit including a diffuser, an optical guide and an edge light-emitting diode (LED) source configured to emit light;
    wherein the spatial light modulator is configured to selectively modulate luminance of the light from the backlight unit; and
    wherein the display unit is configured to be bendable to a fixed shape such that the display unit retains the fixed shape.

2. The assembly of claim 1, wherein the first substrate comprises a polymer layer affixed to a relatively thin blocking layer, the blocking layer comprising an inorganic oxide material.

3. The assembly of claim 1, wherein:
    the color filter layer includes a plurality of color filter patterns formed on a third substrate; and
    the third substrate comprises glass defining a thickness of about 0.1 mm.

4. The assembly of claim 1, wherein the plurality of quantum aligned rods is arranged in a first direction and configured to emit visible light polarized in the first direction.

5. The assembly of claim 1, wherein the display unit is non-rectangular.

6. The assembly of claim 1, wherein the first substrate comprises glass defining a thickness of about 0.1 mm.

7. The assembly of claim 1, wherein the second substrate comprises glass defining a thickness of about 0.1 mm.

* * * * *